(12) United States Patent
Huang et al.

(10) Patent No.: US 10,699,285 B2
(45) Date of Patent: Jun. 30, 2020

(54) SYSTEM AND OPERATING METHOD OF A QUESTIONNAIRE STICKER APPLYING TO VARIOUS COMMUNICATION SOFTWARE PROGRAMS

(71) Applicants: Nen-Fu Huang, Hsinchu (TW);
Wei-Kuan Shih, Hsinchu (TW)

(72) Inventors: Nen-Fu Huang, Hsinchu (TW);
Wei-Kuan Shih, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 123 days.

(21) Appl. No.: 15/834,827

(22) Filed: Dec. 7, 2017

(65) Prior Publication Data
US 2018/0158083 A1    Jun. 7, 2018

(30) Foreign Application Priority Data
Dec. 7, 2016 (TW) .............................. 105140352 A

(51) Int. Cl.
| G06Q 30/02 | (2012.01) |
| G06F 3/0482 | (2013.01) |
| G06F 16/27 | (2019.01) |
| G06F 16/28 | (2019.01) |
| H04L 12/58 | (2006.01) |
| H04L 12/18 | (2006.01) |
| G06F 17/00 | (2019.01) |

(52) U.S. Cl.
CPC ....... *G06Q 30/0203* (2013.01); *G06F 3/0482* (2013.01); *G06F 16/27* (2019.01); *G06F 16/285* (2019.01); *H04L 12/1822* (2013.01); *H04L 51/046* (2013.01); *H04L 51/06* (2013.01); *H04L 51/32* (2013.01); *H04L 51/36* (2013.01)

(58) Field of Classification Search
CPC .................................................. G06Q 30/0203
See application file for complete search history.

(56) References Cited

U.S. PATENT DOCUMENTS

| 2012/0173305 A1* | 7/2012 | Bhaskaran | ............. G06Q 30/02 705/7.32 |
| 2016/0078458 A1* | 3/2016 | Gold | .................. G06Q 30/0201 705/7.32 |
| 2017/0359281 A1* | 12/2017 | Yip | ........................ H04L 51/046 |

* cited by examiner

*Primary Examiner* — Quoc A Tran
(74) *Attorney, Agent, or Firm* — Wang Law Firm, Inc.

(57) ABSTRACT

A system and an operating method of a questionnaire sticker applying to various communication software programs are described. The system includes a server, a user platform, a user end and a sending end. The server includes a group database and a questionnaire sticker database. The group database and the questionnaire sticker database are respectively accessed by a registration interface and a sticker interface included in the user platform. The user end inputs the registration information through the registration interface, so as to create a user group or join a friend group. The sending end selects one of the questionnaire sticker models through the sticker interface to form a questionnaire sticker. The questionnaire sticker is sent to the group members through the corresponding communication software.

12 Claims, 3 Drawing Sheets

SYSTEM AND OPERATING METHOD OF A QUESTIONNAIRE STICKER APPLYING TO VARIOUS COMMUNICATION SOFTWARE PROGRAMS

CROSS-REFERENCE TO RELATED APPLICATION

This application claims priority from Taiwan Patent Application No. 105140352 filed on Dec. 7, 2016 at the Taiwan Intellectual Property Office, the content of which is hereby incorporated by reference in its entirety for all purposes.

BACKGROUND OF THE INVENTION

1. Field of the Invention

The present invention is related to a system and operating method of a questionnaire sticker, and more particularly to a system and an operating method of a questionnaire sticker applying to various communication software programs for transmitting the questionnaire sticker therebetween so as to satisfy different user habits.

2. Description of the Related Art

With respect to the current questionnaire survey methods, the general one thereof is the questionnaire on paper, which is extremely time-consuming and burdensome. More particularly, it always takes a lot of time from the time of handing out the paper questionnaire to the time of completely retrieving the paper questionnaire filled out by the interviewees. Furthermore, the proposer of the paper questionnaire also needs to record and classify the contents thereof one by one, so that, when there are many interviewees or there is copious amount of content in the paper questionnaire, the proposer would be inundated with a large amount of recordings, calculations and statistical workings. Due to the developments of computers and Internet communication techniques, a questionnaire proposer may deliver questionnaires to the interviewees through electronic means such as by e-mails and messages. Similarly, the interviewees may provide their responses through the same means. However, although it may be much easier for the questionnaire proposer to receive the responses, the questionnaire proposer still needs to record and classify the contents thereof one by one. If the software used in the computers or mobile phones of the questionnaire proposer is not the same as that of the interviewees, conditions of a questionnaire response going missing or of an interviewee failing to respond may occur, resulting in inefficiency in the questionnaire survey.

In addition, there being a variety of programs or applications applied to smartphones, and especially, a variety of communication or social applications, which are continuously coming out, is one of the main reasons for ineffective transmission of information. With respect to a variety of communication software, after a user selectively installs one or more communication software applications, the user may interactively communicate with friends who also install the corresponding one or more communication software applications, wherein a plurality of members may cooperatively establish a specific user group to share information with one another. However, applications produced by different inventors may not be compatible with one another, such that users utilizing different applications may not be able to directly communicate with or send information to one another. More specifically, if the commonly used communication applications of users are different, information may not be successfully delivered to the intended recipient. Hence, take the questionnaire survey described above for example, the questionnaires proposed by the questionnaire proposer may be merely sent to interviewees who have installed the same communication software as the questionnaire proposer, while other transmitting methods need to be utilized to make those who have not installed the same communication software receive the same questionnaires. Consequently, with respect to the information transmission and the management of friend groups, sufficient solutions thereto have not yet been proposed.

According to the overall content described above, in a variety of the known communication software, the user group may still not be coordinated with the function of interactive information transmission. Consequently, the inventor of the present invention came up with a system and operating method of a questionnaire sticker applying to various communication software programs to particularly improve the deficiency of known techniques, so as to further enhance the industrial applicability of the present invention.

SUMMARY OF THE INVENTION

In accordance with the deficiency of known techniques described above, the purpose of the present invention is to provide a system and an operating method of a questionnaire sticker applying to various communication software programs, so as to solve the problem that questionnaire stickers cannot be transmitted between user groups of different communication software.

According to the purpose of the present invention, the provided system of a questionnaire sticker applying to various communication software programs includes a server, a user platform, a user end and a sending end. The server includes a group database and a questionnaire sticker database, wherein the group database stores registration information of a plurality of registrations and user group information formed of the plurality of registrations, and the questionnaire sticker database stores a plurality of questionnaire sticker models. The user platform is connected to the server, wherein the user platform includes a registration interface accessing the group database and a sticker interface accessing the questionnaire sticker database. The user end inputs the registration information through the registration interface to accomplish a registration procedure, wherein the registration information includes a registration code of a user and a communication software selected by the user, such that the user end establishes a user group in the group database, and adds a plurality of group members into the user group or a friend group which has been established in the group database. The sending end is the user end after the registration procedure is accomplished, wherein the sending end selects one of the plurality of questionnaire sticker models through the sticker interface to form a questionnaire sticker, and the questionnaire sticker is sent to the user group or the friend group through the communication software according to the registration information. Besides, after the plurality of group members receive the questionnaire sticker through the communication software selected by themselves, a pattern option in the questionnaire sticker is directly selected to generate response information which is sent back to the server, and the server analyzes the response information so as to generate a questionnaire result.

Preferably, the user platform utilizes a web page or an application to present the registration interface and the sticker interface.

Preferably, the registration interface is connected to the communication software selected by the user, so as to access a contact list and transmit invitation information, for inviting members in the contact list to join the user group.

Preferably, the user platform includes a group management interface, which is connected with the group database, such that the user end updates the plurality of group members through the group management interface.

Preferably, the server includes a conversion module, which is connected with the group database and the questionnaire sticker database, such that the conversion module converts the questionnaire sticker into a format conforming to the communication software, and the converted questionnaire sticker is sent to the plurality of group members.

Preferably, the communication software includes an official sticker group, wherein the questionnaire sticker is sent to the official sticker group, and the response information is then sent back to the server after the pattern option is selected by the plurality of group members.

Preferably, the sticker interface includes an editing module, which is connected with the questionnaire sticker database, such that the sending end edits the plurality of questionnaire sticker models through the editing module, so as to form a customized questionnaire sticker.

According to the purpose of the present invention, an operating method of a questionnaire sticker applying to various communication software programs is provided, which is suitable for a questionnaire sticker system including a server, a user platform, a user end and a sending end. Wherein the operating method thereof includes steps as follows: the user end inputs registration information through a registration interface of the user platform to accomplish a registration procedure, and the registration information includes a registration code of a user and a communication software selected by the user; the user end establishes a user group in a group database of the server, and adds a plurality of group members into the user group or a friend group which has been established in the group database; the sending end selects one of a plurality of questionnaire sticker models stored in a questionnaire sticker database of the server through a sticker interface of the user platform, so as to form a questionnaire sticker; the questionnaire sticker is sent to the user group or the friend group through the communication software according to the registration information; a pattern option in the questionnaire sticker is directly selected after the plurality of group members receive the questionnaire sticker through the communication software selected by themselves, so as to generate response information and send the response information back to the server; and the server analyzes the response information so as to generate a questionnaire result.

Preferably, the user platform utilizes a web page or an application to present the registration interface and the sticker interface.

Preferably, the registration interface is connected to the communication software selected by the user, so as to access a contact list and transmit invitation information, for inviting members in the contact list to join the user group.

Preferably, the user end is connected to the group database through a group management interface of the user platform, so as to update the plurality of group members.

Preferably, the questionnaire sticker is converted into a format conforming to the communication software through a conversion module of the server, and the converted questionnaire sticker is sent to the plurality of group members.

Preferably, the questionnaire sticker is sent to an official sticker group of the communication software, and the response information is then sent back to the server through the official sticker group after the pattern option is selected by the plurality of group members.

Preferably, the sending end edits the plurality of questionnaire sticker models through an editing module of the sticker interface, so as to form a customized questionnaire sticker.

On the basis of the descriptions above, the system and operating method of a questionnaire sticker applying to various communication software programs have one or more advantages described as follows:

(1) The system and operating method of a questionnaire sticker applying to various communication software programs are suitable for a variety of communication software programs, such that users may receive questionnaire stickers through their commonly used communication software program without installing specific software, so as to elevate the convenience of usage.

(2) The system and operating method of a questionnaire sticker applying to various communication software programs may enable the user end to establish one or more appropriate user groups, and moreover, group members thereof may also be managed through the user platform regardless of the type of communication software used, so as to improve the compatibility of user groups established between different communication software programs.

(3) The system and operating method of a questionnaire sticker applying to various communication software programs may allow selecting appropriate questionnaire stickers through the user platform, and sending the selected questionnaire stickers to group members, such that a sticker pattern of the questionnaire sticker is directly selected to generate response information which is sent back to the server, and a questionnaire result is eventually generated through automatic analysis. As a result, the procedure of a questionnaire survey may be significantly simplified.

DESCRIPTION OF THE PREFERRED EMBODIMENTS

Figure 1:
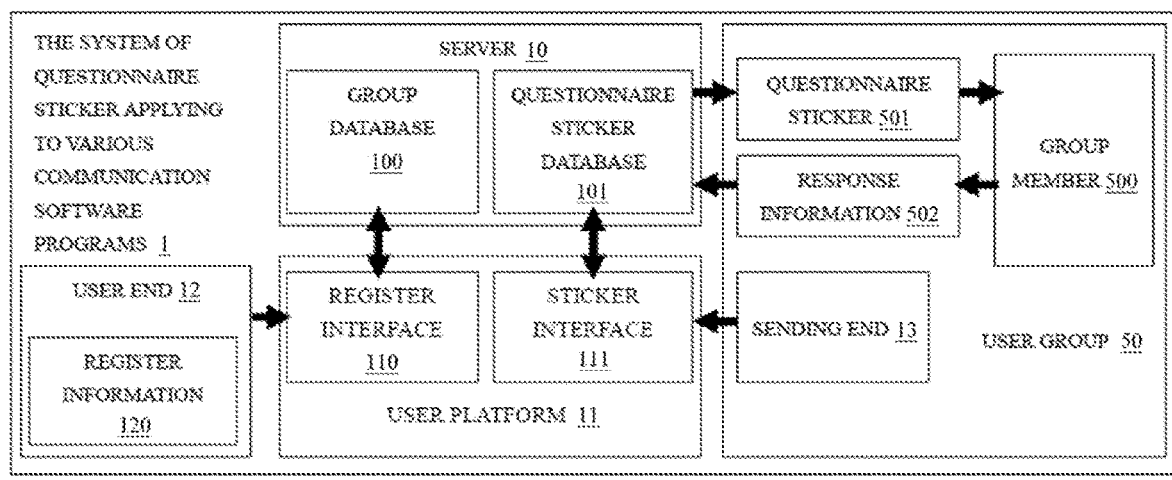
FIG. 1 is a block diagram of one embodiment of the system of a questionnaire sticker applying to various communication software programs of the present invention.

For a better understanding of the technical features, details and advantages of the present invention as well as the achievable effects thereof, the present invention is explicitly described below in the form of embodiments with reference to the appended drawings. The drawings present schematics of the present invention and assist with the specification, whereby what is depicted in the drawings does not necessarily conform to the real dimensions and precise layout of the present invention. That is, the actual scope of the practical implementation of the present invention is not confined by the dimensions and layout depicted in the appended drawings.

Please refer to FIG. 1, which is the block diagram of one embodiment of the system of a questionnaire sticker applying to various communication software programs of the present invention. As illustrated in FIG. 1, the system 1 of a questionnaire sticker applying to various communication software programs includes a server 10, a user platform 11, a user end 12 and a sending end 13. The server 10 includes a group database 100 and a questionnaire sticker database 101, wherein the server 10 may be a computer server which includes a plurality of database accessing storage units or a cloud server constructed via cloud storage units. The group database 100 stores registration information 120 of a plurality of registrations in the database, and the questionnaire sticker database 101 stores a variety of questionnaire sticker models. The user platform 11 is connected to the server 10, wherein the user platform 11 includes accessing interfaces to access the database in the server 10, which include a registration interface 110 accessing the group database 100 and a sticker interface 111 accessing the questionnaire sticker database 101. The user platform may be set in a variety of ways. For example, when the user platform is an Internet platform, users may be connected to the server 10 through a web page interface. In another example, if the user platform is designed as an application (App), users may control the system through an App interface installed in their mobile devices such as smartphones and tablet computers. Consequently, the versatility and convenience of using the present invention are significantly increased.

Regarding the user platform 11 described above, the user end 12 may input the registration information 120 through the registration interface 110 to accomplish a registration procedure, wherein the registration information 120 includes the registration code of the user, basic information like name and communication software selected by the user. More specifically, the communication software selected herein includes at least two kinds of communication software, and users may register a variety of communication software and also the priority use sequence thereof. Currently, the common communication software mainly includes Line, Messenger, WeChat, which are all suitable for the system 1 of a questionnaire sticker applying to various communication software programs, but the present invention is not limited thereto. That is, any communication software, which can be installed in electronic devices and enables users to interactively transmit information or stickers, is supposed to be included in the communication software defined in the present invention. After the registration is successfully conducted, the user end 12 may establish an own user group 50 in the group database 100, simultaneously set the group members 500 in the own user group 50 by means of inviting or adding friends and contact persons, and make the group members 500 join the user group 50 through registration. The detailed operation method thereof will be further described with reference to embodiments below. Besides, the user group 50 may include friend groups which have been established in the group database 100. After the registration procedure is accomplished, the user end 12 may also be added into the friend group as one of the group members 500. Furthermore, the user end 12 may be added into a plurality of user groups 50 at the same time, so as to form a plurality of friend groups with different group members, such that the use flexibility of the present invention in different social circles is increased.

Any user end 12 after the registration procedure can be utilized as the sending end 13 for transmitting questionnaire stickers. The sending end 13 may access a plurality of questionnaire sticker models stored in the questionnaire sticker database 101 through the sticker interface 111. In one embodiment of the present invention, the sending end 13 is the questionnaire proposer, who selects a questionnaire model conforming to items of a planned questionnaire survey from the questionnaire sticker database 101, so as to form the questionnaire sticker 501. The sending end 13 may choose to transmit the questionnaire sticker 501 to a plurality of user groups 50, i.e. transmit the questionnaire sticker 501 to different user groups 50 or friend groups which are established or added by the user end 12, and subsequently transmits the questionnaire sticker 501 to different group members 500 in the user group 50 through the server 10; or, the sending end 13 may choose to transmit the questionnaire sticker 501 to specific user groups 50 or specific group members 500. At this time, the questionnaire sticker 501 transmitted by the server 10 is delivered via the communication software selected by the users according to the registration information 120. In other words, the group members 500 may receive the questionnaire sticker 501 through their commonly used communication software without installing extra specific questionnaire sticker software.

After the group members 500 receive the questionnaire sticker 501 through the corresponding communication software installed in their own electronic devices, the group members 500 may view the questions and explanations in the questionnaire sticker 501, wherein the explanations include text message explanations and sticker explanations. Subsequently, after a response option is chosen, a pattern option in the questionnaire sticker 501 is directly selected to generate response information 502, which is then sent back to the server 10. Eventually, the server 10 analyzes the response information 502 finished by the group members 500 so as to generate a questionnaire result. The questionnaire result may be transmitted to the sending end 13 of the questionnaire proposer and also directly to the user group 50 for presenting the questionnaire result to the group members who finished the questionnaire survey. More specifically, means of directly selecting the pattern option of the questionnaire sticker 501 by the group members 500 includes directly touching the questionnaire sticker 501 presented by a communication software on a touch screen or selecting a pattern option of the questionnaire sticker 501 by utilizing input devices such as the mouse, keyboard and touch pen. After the selection step described above, the communication software automatically triggers a function of response generation included in the pattern option, i.e. the response information 502 is generated and then sent back to the server 10. Hereby, due to the questionnaire sticker 501 with two-way communications, users not only need not repeatedly input the response and send back the response, but also may avoid generating too much response information in the user group, such that an issue that excessive response information is too messy to be recorded and analyzed may be avoided accordingly.

Figure 2:
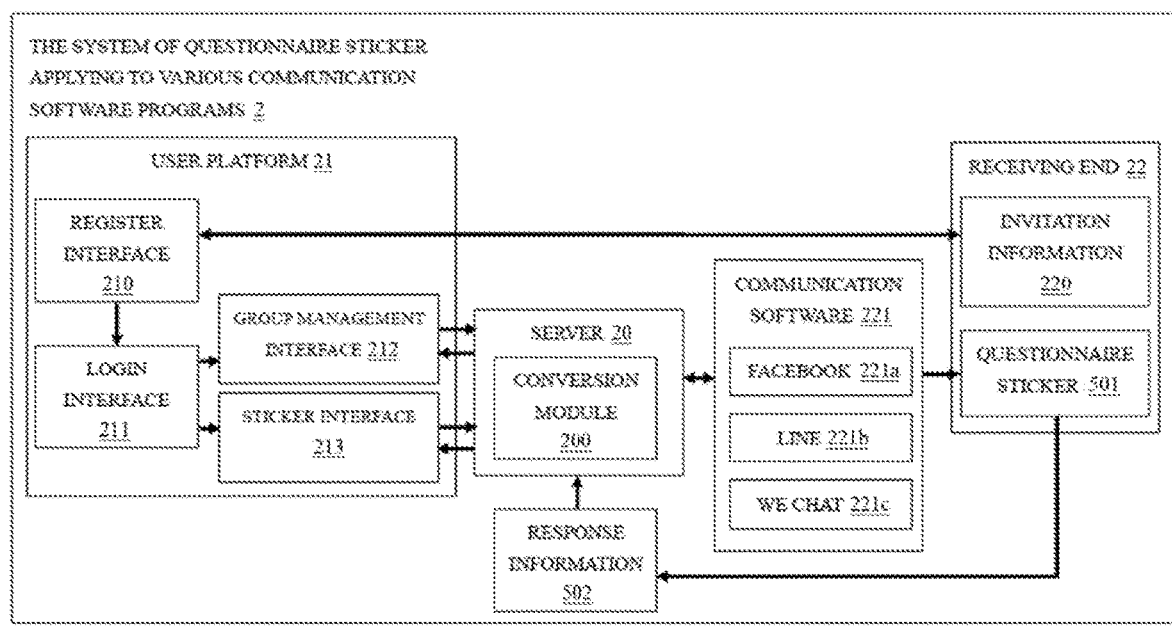
FIG. 2 is a schematic diagram of one embodiment of the system of a questionnaire sticker applying to various communication software programs of the present invention.

Please refer to FIG. 2, which is a schematic diagram of one embodiment of the system of a questionnaire sticker applying to various communication software programs of the present invention. As illustrated in FIG. 2, the user platform 21 is connected to a server 20 and includes a plurality of interfaces for accessing data in the server 20. First of all, the registration interface 210 provides users to input the registration information so as to complete the registration procedure for joining the platform, wherein as described above, the registration information is input by utilizing at least one kind of communication software 221. In the present embodiment, the communication software 221 includes Facebook 221a, Line 221b and WeChat 221c, but the present invention is not limited thereto, i.e. types of the communication software may be more various in other embodiments of the present invention. Besides, for the sake of use safety, the registration information may further include the user code and the login password, such that, after the registration procedure is finished, users may utilize their own registered accounts and passwords to enter the user platform 21 through the login interface 211. At this time, the user platform 21 is configured with the group management interface 212 for managing the user group and the sticker interface 213 for selecting questionnaire stickers, wherein the group management interface 212 is connected to the server 20, establishes the user group in the group database, and simultaneously adds the invited friends into the user group. The invitation herein is conducted by users who transmit the invitation information 220 to the receiving end 22, wherein users may select target persons to transmit invitations according to the classification of the group or the subject of a questionnaire survey. Or, the registration interface is connected with the communication software 221 selected by users, such that part or all of the members in the contact list may then be invited to join the user group. Subsequently, after the receiving end 22 receives the invitation information 220, users may connect to the user platform 21 through the web page connection provided in the invitation information 220 or through installation of applications, so as to proceed with the registration procedure and eventually join the established friend group after the registration procedure is finished.

After the establishment of the user group is finished, users may receive further update about the group members through the group management interface 212, such as added group members, leaving group members or reestablished new user groups for inviting members different from the original ones to join. In the system, an identical user may simultaneously belong to different user groups in the group database, such as friend group, colleague groups and family groups, based on requirements thereof. When a user needs to propose questionnaire surveys like a dining date survey or a meeting time survey to one or more belonged user groups or specific friends, the users may connect to the server 20 through the sticker interface 213, and select one or more questionnaire sticker models stored in the database. For example, when there are two options of the dining date, the users may select the model having two options like A, B as well as I, II, and also add the questionnaire explanation thereto, so as to form the questionnaire sticker 501. The questionnaire sticker models in the server herein may be occasionally updated. Or, the sticker interface 213 may include the editing module, through which users may directly modify the questionnaire sticker models, wherein the modification includes the option type, questionnaire explanation and so forth, such that the diversity of questionnaire sticker models may be significantly increased, and the customized questionnaire sticker generated after the modification may be more appropriate to express the content of designed questionnaire surveys.

Users may select and input the content of a questionnaire through the sticker interface. The content of a questionnaire is then converted into an information format conforming to each communication software 221 by the conversion module 200 in the server 20, so as to further form the questionnaire sticker 501 to conform to the information format of each communication software 221. Eventually, the questionnaire sticker 501 is sent to one or more belonged user groups or specific group members. Additionally, the conversion module 200 herein may conduct the conversion of format through the application programming interface (API) provided by the communication software 221. That is, with respect to different types of the communication software 221, the server 20 may utilize the corresponding application programming interface (API) to convert the questionnaire sticker 501 into the formats conforming to specific communication software 221. At this time, the group members in the user group may receive or present the questionnaire sticker 501 through the originally selected communication software 221. For example, when the user group includes 6 friends using Facebook 221a, 10 friends using Line 221b and 8 friends using WeChat 221c, the questionnaire sticker 501 is then delivered through the information transmitting mechanisms (such as the chatting room and information field) of Facebook 221a, Line 221b and WeChat 221c respectively, so as to avoid transmitting the questionnaire sticker 501 through only one kind of communication software 221 and also avoid the condition that the group members without using the only one kind of communication software 221 are not able to receive the questionnaire sticker 501. Similarly, with respect to the embodiment described above, after the group members of the receiving end 22 receive the questionnaire sticker 501, the pattern options in the questionnaire sticker 501 may be directly selected, and the automatic response mechanism included in the pattern options may generate the response information 502 and then send the response information 502 back to the server 20. Similarly, the server 20 may record and classify the received response information 502, accordingly generate the questionnaire result, and transmit the questionnaire result to the user platform or the questionnaire proposer. Before the final result is generated, the questionnaire result is delivered to each group member who finished the questionnaire in the user group. On the other hand, the time limit of the server 20 recording and classifying the response information 502 may be predetermined, and the questionnaire sticker 501 may be resent to the receiving ends 22 which have not yet responded after the predetermined time limit has passed, such that the questionnaire proposer may easily acquire the questionnaire result without going through a burdensome statistical procedure and sending the questionnaire sticker 501 to users utilizing different communication software 221, so as to effectively improve the efficiency of a questionnaire survey.

Please refer to FIG. 2 again. In another embodiment of the present invention, if the selected communication software 221 is not capable of providing the corresponding application programming interface (API) to directly convert the format of a questionnaire sticker 501, users may utilize the design of an official account in the communication software 221 to establish the official sticker group therein, and subsequently make the receiving end 22 join the official sticker group, such that, when carrying out one or more questionnaire surveys, the questionnaire sticker 501 is firstly sent to the official sticker group to make the receiving end 22 receive the questionnaire sticker 501 therein, and after the pattern option is chosen, the response information 502 is subsequently generated by the official sticker group and sent back to the server 20. Hence, with respect to the method described above, only access to the sticker information in the design of an official account needs to be considered, such that, if the application programming interface (API) cannot be utilized to convert the format of a questionnaire sticker

501, the method of using the official sticker group will be the best operating method to achieve the closest effect.

Figure 3:
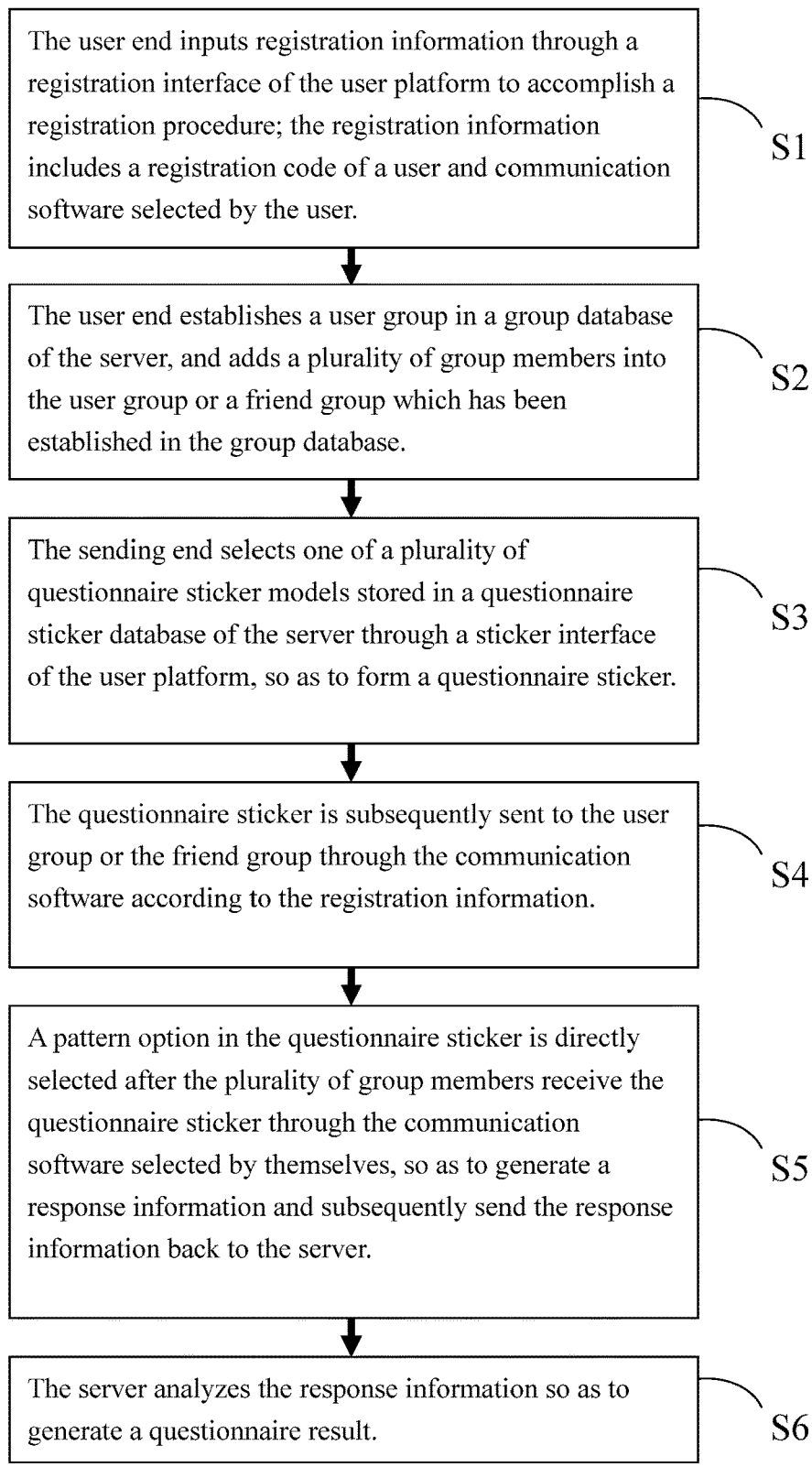
FIG. 3 is a flow chart of one embodiment of the operating method of a questionnaire sticker applying to various communication software programs of the present invention.

Please refer to FIG. 3, which is the flow chart of one embodiment of the operating method of a questionnaire sticker applying to various communication software programs of the present invention. The operating method is suitable for a questionnaire sticker system, which includes a server, a user platform, a user end and a sending end, wherein the operating method thereof includes steps as follows (S1-S6):

Step S1: the user end inputs registration information through a registration interface of the user platform to accomplish a registration procedure, wherein the registration information includes a registration code of a user and communication software selected by the user. Please refer to FIG. 1, the user end 12 inputs the registration information 120 through the registration interface 110 of the user platform 11, and the registration information 120 is then stored in the group database 100 in the server 10. The registration information 120 may include the registration code, login account, login password, basic information and selected communication software of the user, wherein the communication software may include at least one kind of software and the priority use sequence thereof. During the registration procedure, the registration interface may be authorized to connect with the selected communication software for accessing the information of the contact list as the reference when sending invitation information in the latter step.

Step S2: the user end establishes a user group in a group database of the server, and adds a plurality of group members into the user group or a friend group which has been established in the group database. The user end 12 may establish one or more user groups 50 in the group database 100, wherein the group members therein may include friends, colleagues, parents, and so forth. In the procedure of adding group members, the invitation information may be transmitted to specific users, which include part or all of the members in the aforementioned contact list. Subsequently, those who receive the invitation information may connect to the registration interface for proceeding with the registration procedure, and then join the established user group after inputting the registration information 120. Besides, the registration interface may include a group management interface. The user end may connect to the group database of the server 10 through the group management interface, such that the user end may further add or delete members of the group members 500, or update the registration information of the group members 500, such as updating the selected communication software of the group members 500.

Step S3: the sending end selects one of a plurality of questionnaire sticker models stored in a questionnaire sticker database of the server through a sticker interface of the user platform, so as to form a questionnaire sticker. Any member among the user end 12 accomplishing the registration procedure may act as the sending end 13 transmitting the questionnaire sticker. Subsequently, the sending end 13 is connected with the questionnaire sticker database 101 through the sticker interface 111, and selects the questionnaire sticker model therein, so as to form the questionnaire sticker 501. The questionnaire sticker 501 includes pattern options, wherein all the content and number of items of the pattern options as well as the original model may be modified through an editing module so as to form a customized questionnaire sticker, which may conform to the real intention of a questionnaire survey more closely.

Step S4: the questionnaire sticker is subsequently sent to the user group or the friend group through the communication software according to the registration information. The selected or edited questionnaire sticker may be converted into a format conforming to the corresponding communication software through the conversion module in the server 10, and subsequently transmitted to one or more user groups 50 selected by the user and the group members 500 therein, or to the specific group members 500. Each of the group members 500 may receive the questionnaire sticker 501 through the originally selected communication software, or receive the questionnaire sticker 501 through the official sticker group in the communication software.

Step S5: a pattern option in the questionnaire sticker is directly selected after the plurality of group members receive the questionnaire sticker through the communication software selected by themselves, so as to generate response information and subsequently send the response information back to the server. After the group members 500 receive the questionnaire sticker 501, the pattern option of the questionnaire sticker 501 is directly selected, such that the automatic response mechanism included in the pattern option is triggered to generate the response information 502 and then send the response information 502 back to the server 10. Or, in another embodiment of the present invention, the group members 500 may select the pattern option in the questionnaire sticker 501 through the official sticker group, such that the selected pattern option may be then sent back to the server 10 through the official sticker group.

Step S6: the server analyzes the response information so as to generate a questionnaire result. After the server 10 receives the response information 502, according to the predetermined time limit, the server 10 starts to record and count the number of each option selected, so as to generate the questionnaire result, wherein the questionnaire result may be directly transmitted to the sending end 13 of the questionnaire proposer or to the receiving end of the questionnaire survey for presenting the questionnaire result to the group members 500 who received the questionnaire survey.

All the steps of the operating method described above are suitable for a questionnaire sticker applying to various communication software programs, wherein the user platform may make the users connect to the server via the manner of a web page for further handling, or users may install applications in the electronic devices thereof and acquire the function of accessing the server via the application programming interface. Through the methods described above, issues of the burdensome conventional questionnaire and statistical procedures may be simultaneously solved, and moreover, when the questionnaire is proposed through communication software, issue of incompatibility between a variety of communication software may be solved as well, such that the efficiency of a questionnaire survey is effectively improved.

The descriptions above are merely for the purpose of exemplifying rather than limiting the present invention. Therefore, numerous modifications, variations and enhancements can be made thereto by those skilled in the art without departing from the spirit and scope of the invention as set forth in the claims.

What is claimed is:

1. A system of a questionnaire sticker applying to various communication software programs, comprising:
    a server, comprising a group database, a conversion module and a questionnaire sticker database, the group database storing registration information of a plurality of registrations and user group information formed from the plurality of registrations, and the questionnaire sticker database storing a plurality of questionnaire sticker models, and the conversion module connected to the group data base and the questionnaire sticker database;
    a user platform, connected to the server, the user platform comprising a registration interface accessing the group database and a sticker interface accessing the questionnaire sticker database;
    a user end, inputting the registration information through the registration interface to accomplish a registration procedure, the registration information comprising a registration code of a user and a communication software selected by the user, wherein the user end establishes a user group in the group database, and adds a plurality of group members into the user group or a friend group which has been established in the group database; and
    a sending end, being the user end after the registration procedure is accomplished, the sending end selecting one of the plurality of questionnaire sticker models through the sticker interface to form a questionnaire sticker corresponding to the format of the communication software of the user group or the friend group by the conversion module, and the questionnaire sticker being sent to the user group or the friend group through the communication software according to the registration information;
    wherein, after the plurality of group members receive the questionnaire sticker through the communication software selected by themselves, a pattern option in the questionnaire sticker is directly selected to generate response information which is sent back to the server, and the server analyzes the response information so as to generate a questionnaire result.

2. The system of a questionnaire sticker applying to various communication software programs of claim 1, wherein the user platform utilizes a web page or an application program to present the registration interface and the sticker interface.

3. The system of a questionnaire sticker applying to various communication software programs of claim 1, wherein the registration interface is connected to the communication software selected by the user, so as to access a contact list and transmit invitation information, for inviting members in the contact list to join the user group.

4. The system of a questionnaire sticker applying to various communication software programs of claim 1, wherein the user platform comprises a group management interface, which is connected with the group database, such that the user end updates the plurality of group members through the group management interface.

5. The system of a questionnaire sticker applying to various communication software programs of claim 1, wherein the communication software comprises an official sticker group, the questionnaire sticker is sent to the official sticker group, and the response information is then sent back to the server after the pattern option is selected by the plurality of group members.

6. The system of a questionnaire sticker applying to various communication software programs of claim 1, wherein the sticker interface comprises an editing module, which is connected with the questionnaire sticker database, such that the sending end edits the plurality of questionnaire sticker models through the editing module, so as to form a customized questionnaire sticker.

7. An operating method of a questionnaire sticker applying to various communication software programs, suitable for a questionnaire sticker system comprising a server, a user platform, a user end and a sending end, the operating method thereof comprises steps as follows:
    the user end inputs registration information through a registration interface of the user platform to accomplish a registration procedure, the registration information comprises a registration code of a user and a communication software selected by the user;
    the user end establishes a user group in a group database of the server, and adds a plurality of group members into the user group or a friend group which has been established in the group database;
    the sending end selects one of a plurality of questionnaire sticker models stored in a questionnaire sticker database of the server through a sticker interface of the user platform, so as to form a questionnaire sticker corresponding to the format of the communication software of the user group or the friend group by a conversion module of the server;
    the questionnaire sticker is sent to the user group or the friend group through the communication software according to the registration information;
    a pattern option in the questionnaire sticker is directly selected after the plurality of group members receive the questionnaire sticker through the communication software selected by themselves, response information is generated and sent back to the server; and
    the server analyzes the response information and generates a questionnaire result.

8. The operating method of a questionnaire sticker applying to various communication software programs of claim 7, wherein the user platform utilizes a web page or an application program to present the registration interface and the sticker interface.

9. The operating method of a questionnaire sticker applying to various communication software programs of claim 7, wherein the registration interface is connected to the communication software selected by the user, so as to access a contact list and transmit invitation information for inviting members in the contact list to join the user group.

10. The operating method of a questionnaire sticker applying to various communication software programs of claim 7, wherein the user end is connected to the group database through a group management interface of the user platform, so as to update the plurality of group members.

11. The operating method of a questionnaire sticker applying to various communication software programs of claim 7, wherein the questionnaire sticker is sent to an official sticker group of the communication software, and the response information is then sent back to the server through the official sticker group after the pattern option is selected by the plurality of group members.

12. The operating method of a questionnaire sticker applying to various communication software programs of claim 7, wherein the sending end edits the plurality of questionnaire sticker models through an editing module of the sticker interface, so as to form a customized questionnaire sticker.

* * * * *